United States Patent [19]

Huntington

[11] 4,220,347
[45] Sep. 2, 1980

[54] SAFETY PIANO DOLLY

[76] Inventor: Gordon T. Huntington, 4121 W. 13400 South, Riverton, Utah 84065

[21] Appl. No.: 971,421

[22] Filed: Dec. 20, 1978

[51] Int. Cl.³ .............................................. B62D 21/12
[52] U.S. Cl. .................................. 280/79.1 A; D12/31
[58] Field of Search .......... 280/47.34, 79.1 R, 79.1 A, 280/35; D12/31; 68/138; 248/129

[56] References Cited

U.S. PATENT DOCUMENTS

| | | | |
|---|---|---|---|
| 402,341 | 4/1889 | Martin | 280/79.1 R X |
| 682,662 | 9/1901 | Bartholomew | 280/35 X |
| 1,322,719 | 11/1919 | Nelson | 280/35 |
| 1,887,067 | 11/1932 | Pehrsson | 280/35 |
| 2,370,548 | 2/1945 | Kordes | 280/79.1 |
| 2,971,768 | 2/1961 | Ackley et al. | 280/35 |
| 2,971,769 | 2/1961 | Gaddis | 280/79.1 A |
| 3,533,640 | 10/1970 | Fator | 280/79.1 A X |
| 3,633,774 | 1/1972 | Lee | 280/79.1 R X |
| 3,918,733 | 11/1975 | Macho et al. | 280/79.1 R X |

Primary Examiner—John J. Love
Assistant Examiner—Michael Mar
Attorney, Agent, or Firm—Clarence A. O'Brien; Harvey B. Jacobson

[57] ABSTRACT

A piano dolly for mounting, storing, and transporting an upright piano. A pair of dollies is used with a single upright piano, each dolly having a recessed carrying arm on which are mounted an upraised support plate supported in the longitudinal direction and a second upraised support plate in the transverse direction, each support plate supporting a wheeled caster. A piano provided with a pair of such dollies is prevented from inadvertent upset in storage or in playing situations, while mobility of the piano in transport over typical floor surfaces is unaffected. The invention can alternatively be used for storing and transporting a portable organ, or a bulky article of furniture, such as a sofa, or the like.

4 Claims, 8 Drawing Figures

SAFETY PIANO DOLLY

BACKGROUND OF THE INVENTION

1. Field of the Invention

The invention relates to a carrier means for easing the movement of an upright piano from one area to another. More particularly, the invention contemplates a safety piano dolly which prevents upset of the piano from inadvertent contact by child or adult, by providing a pair of wheeled dollies for transporting an upright piano resting on the dollies, each piano dolly having a recessed carrying arm on which are mounted an upraised support plate in the longitudinal direction and a second upraised support plate in the transverse direction for support of casters. An upwardly projecting pin can engage recesses in the lower surface of the piano.

2. Description of the Prior Art

In U.S. Pat. No. 1,887,067, issued Nov. 8, 1932, to Pehrsson, and in U.S. Pat. No. 1,322,719, issued Nov. 25, 1919, to Nelson, piano trucks are disclosed for transporting grand pianos, but neither patent shows an upwardly projecting pin for seating in a recess on the bottom surface of the piano in order to prevent lateral shifting. Upright piano trucks are disclosed in U.S. Pat. No. 682,662, issued Sept. 17, 1901, to Bartholomew, and U.S. Pat. No. 402,341, issued Apr. 30, 1889, to Martin. Bartholomew requires a frame supported by rollers and also by a pair of wheels, as well as spring-plates and rods furnished with nuts and washers to secure the piano to the truck. U.S. Pat. No. 3,533,640, issued Oct. 13, 1970, to Fator, shows a dolly with wings or extensions on a structure having bracket arms and a body forming the recess in which a load, not specifically disclosed as a piano, can be carried.

A drawback associated with many conventional piano dollies is the mechanical instability when in use with an upright piano. A number of pianos in use in school situations have been tipped over inadvertently and caused injury, and in at least two known instances, such accidents have resulted in fatalities.

SUMMARY OF THE INVENTION

Accordingly, it is an object of the present invention to provide a piano dolly for safely supporting an upright piano while permitting the piano so supported to be moved easily, particularly in school and commercial situations.

Another object of the invention is to make it possible for a piano so provided to be moved easily over any floor surface, including carpeted, solid, or other type of surface.

Still another object of the invention is to provide a dolly which is adjustable to fit any conventional upright piano, including both new and older constructions.

A further object of the invention is to provide a dolly for transporting an upright piano without affecting substantially the piano height when installed.

Still another object of the invention is to provide a piano dolly which permits passage of the piano through a conventional width door of 36 inches.

Still a further object of the invention is to provide a piano dolly having vertical pins adapted for insertion into caster holes conventionally placed in the bottom surface of an upright piano.

Another further object of the invention is to provide piano dollies having provision for adjustment of the vertical pins to allow for positioning to correspond with the location of recesses or caster holes in a conventional upright piano.

These and other objects are achieved with a pair of safety piano dollies, each individual dolly of the pair symmetrically positionable at each end of the piano. The piano dolly has upwardly projecting vertical pins for insertion in corresponding caster holes in the lower surface of the piano, such pins assisting substantially in prevention of piano upset or tipping over.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
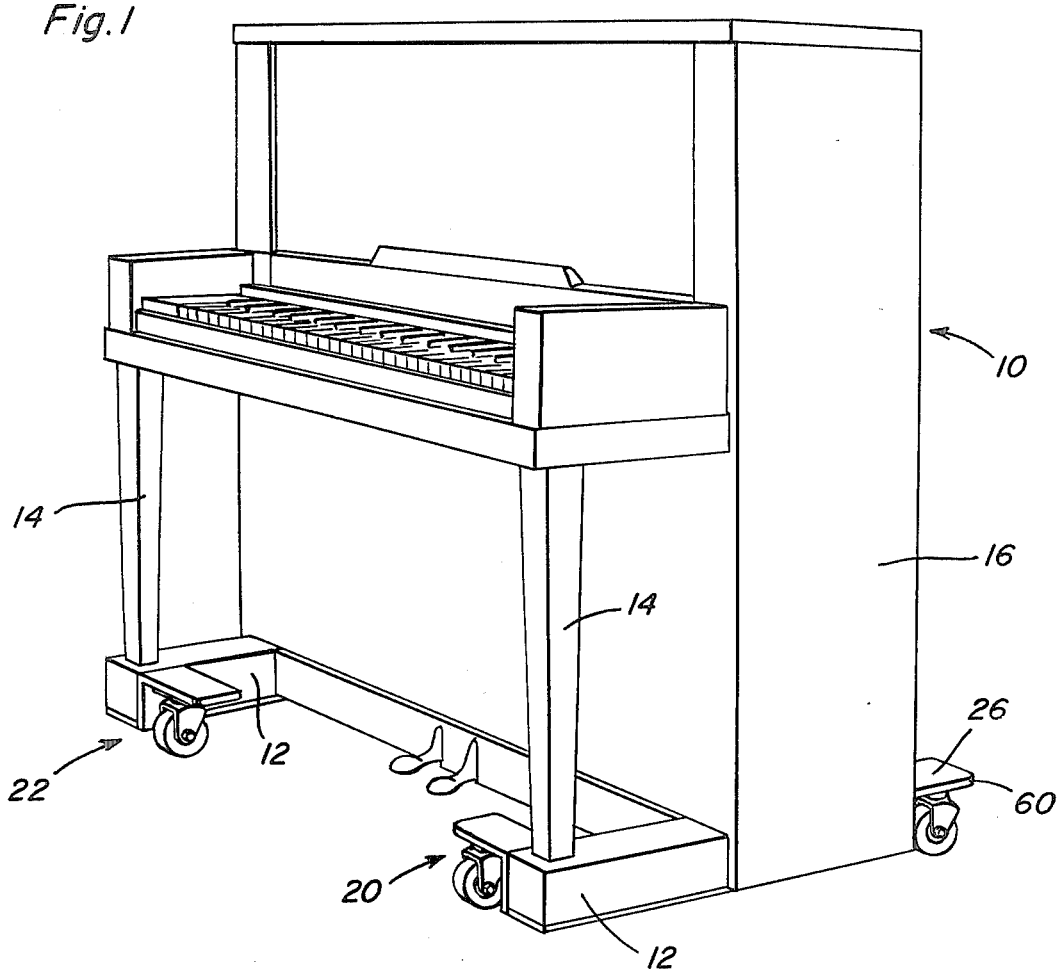
FIG. 1 is a perspective view of an upright piano mounted upon a pair of safety piano dollies of the present invention.
Figure 2:
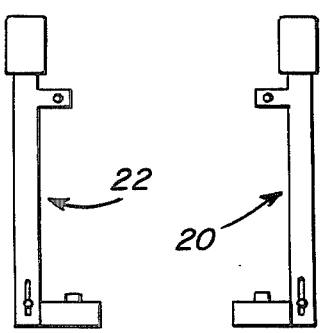
FIG. 2 is a top plan view of a pair of dollies of the present invention.
Figure 6:
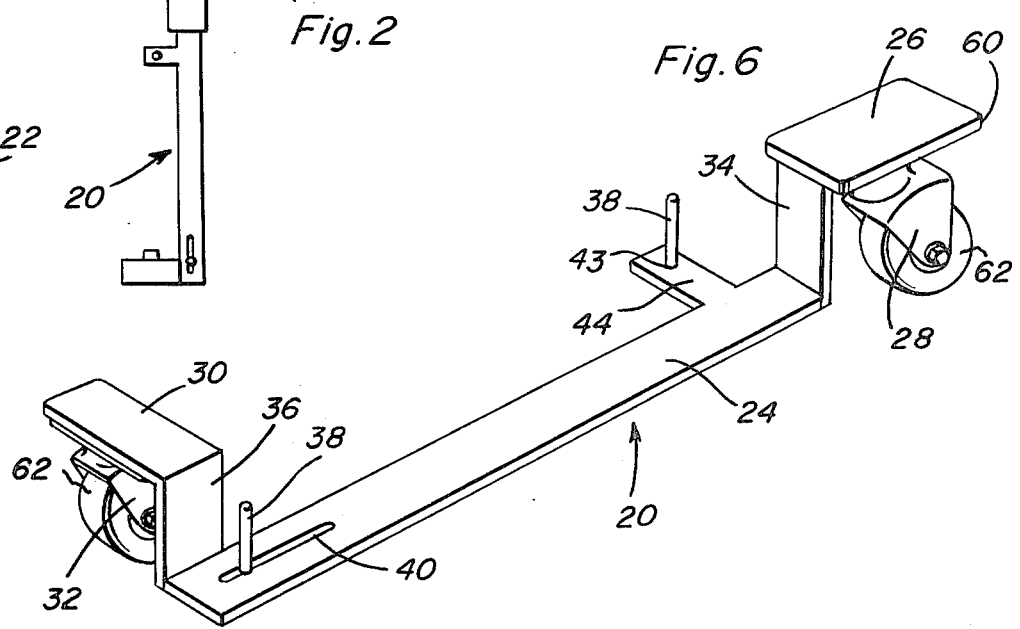
FIG. 6 is a perspective view of the rightward piano dolly of FIG. 2, wherein the forward vertical retaining pin is adjustable longitudinally.

FIG. 1 shows a conventional upright piano 10 having forwardly projecting horizontal support arms 12 and front vertical support legs 14. Support arms 12 are joined to the frame of piano 10, which frame includes side panels 16 and base 18. The safety piano dollies of the present invention consist of right dolly 20 and symmetrical left dolly 22, other views of which are shown in FIGS. 2 and 6. It is to be understood that the present invention contemplates use of a pair of dollies, such as right dolly 20 and left dolly 22, and that reference to component parts of right dolly 20 throughout the specification implies a corresponding left dolly 22 having corresponding symmetrically disposed components on left dolly 22.

Dolly 20 includes an elongated longitudinal carrying arm 24, a rear elevated longitudinal support plate 26 supported from the rear end of arm 24 on which is mounted an underslung rearward caster 28, a forward elevated transverse support plate 30, on which is mounted an underslung forward caster 32, a vertical bracket arm 34 connecting the arm 24 and plate 26, a vertical bracket arm 36 connecting the arm 24 and plate 26, and two vertical pins 38 for imparting stability to the entire arrangement. These pins include an adjustable forward pin 38 projecting upwardly through a longitudinal slot 40 in arms 24, and rearward pin 38 mounted on a laterally projecting transverse tab 44 supported from the forward end portion of carrying arm 24.

Figure 3:
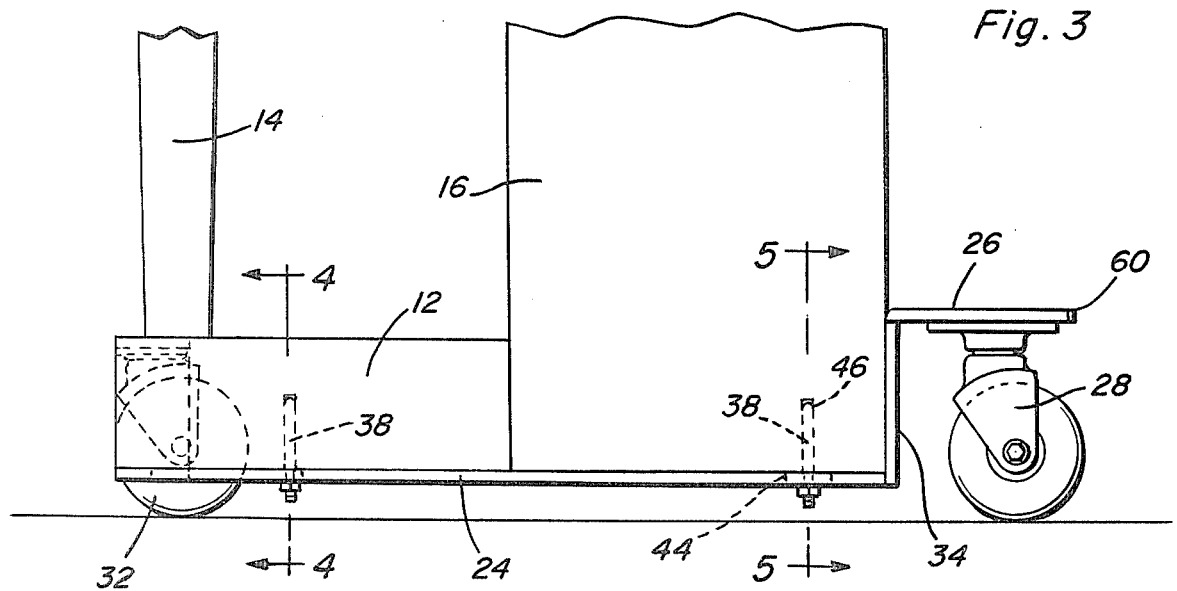
FIG. 3 is a fragmentary enlarged side elevational view of the piano of FIG. 1 mounted on the dollies of the present invention in the leftward direction facing the keyboard.
Figure 4:
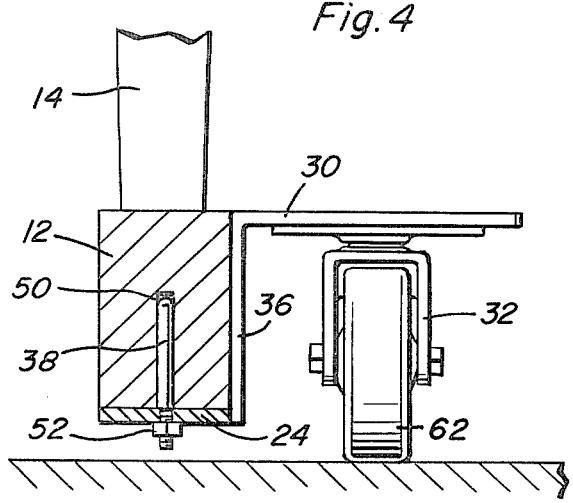
FIG. 4 is an enlarged fragmentary sectional view taken substantially upon a plane passing along section line 4—4 on FIG. 3, showing details of the transversely mounted caster wheel support platform when the dolly of the present invention is in use for support and transport of an upright piano.
Figure 5:
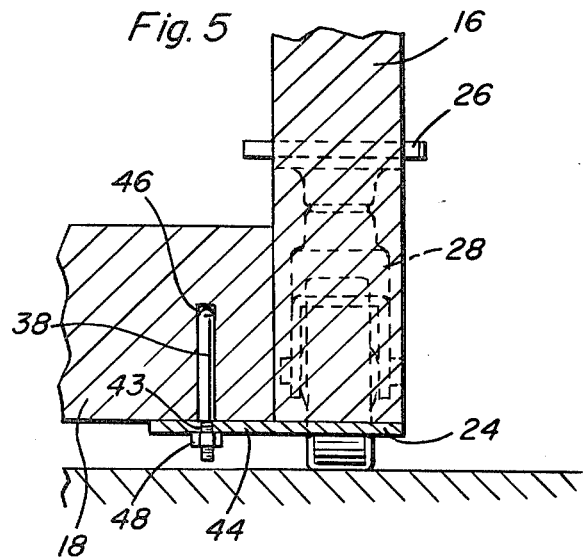
FIG. 5 is an enlarged fragmentary sectional view of the rearward mount, taken substantially upon a plane passing along section line 5—5 on FIG. 3, showing details of the longitudinal caster wheel support platform when the piano dolly of the invention is in use to support an upright piano.

Referring now to FIGS. 3, 4 and 5, the association of the piano dolly with upright piano 10 in a carrying position is shown in detail. Casters 28 and 32 are capable of swinging through 360° to permit piano 10 to travel in any desired direction of motion through rotation of the plane of casters 28 and 32 into the direction of horizontal motion. Rearward pin 38, projecting upwardly into recess 46, is threaded at its lower end for mounting by tightening of nut 48 to attach pin 42 at mounting hole 43 to tab 44. Alternatively, pin 38 can be attached through hole 43 by other suitable means, such as by tightening into a compatibly threaded hole in tab 44, or by welding or by other suitable means. In the event that recess 46 is not present in the position corresponding to the location of pin 38, recess 46 can be drilled by conventional means into base 18 for appropriate insertion of pin 38. Moreover, in the embodiment illustrated in FIG. 5, pin 38 can be inserted from below tab 44 after correct positioning of tab 44 with respect to recess 46. In this manner, piano 10 can be mounted without lifting of the piano a substantial height above the level of carrying arm 24. In some cases, upright pianos of conventional construction have a board near their bottom surface which interferes with access to recess 46. Such a board can be cut with a conventional wood saw in order to attach dolly 20 in the manner described herein. Cutting of such a board to allow insertion of pin 38 in recess 46 has no appreciable effect on the performance, appearance, or other characteristics of piano 10.

Referring specifically to FIG. 4, front caster 32 also is mounted to front support platform 30 to permit rotation through a full 360°, thus permitting piano 10 to be transported in any desired direction with use of the present invention. Forward pin 38 is mounted in recess 50 of support arm 12, and is attached by nut 52 at the lower threaded portion thereof to carrying arm 24. The lower threaded portion of pin 38 is slidable in slot 40 (in the embodiment of FIG. 6) or slot 54 (in that of FIG. 7) to the position corresponding to the location of recess 50, which varies with the model of conventional upright piano to be carried with the present invention.

Figure 8:
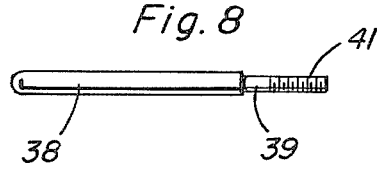
FIG. 8 is a perspective view of a vertical retaining pin.
Figure 7:
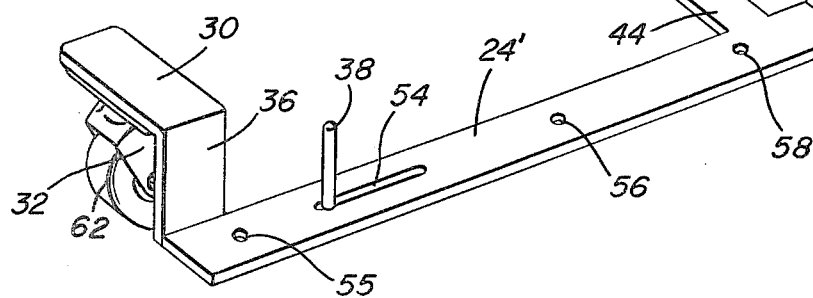
FIG. 7 is a perspective view of a second embodiment of the rightward piano dolly, where the forward vertical retaining pin is not adjustable longitudinally.

FIG. 7 shows a second embodiment of the present invention, differing from the dolly described in FIGS. 2 to 6 only in the details of placement of vertical pins. Forward pin 38 may be mounted in a through hole 55 in carrying arm 24', but provision is made for placing forward pin 38 elsewhere along the longitudinal extent of carrying arm 24'. For example, forward pin 38 can be positioned within slot 54 or at through hole 56. Moreover, rearward pin 38 can be positioned at through hole 58. Holes 55, 56 and 58 are intended for use with attaching means, preferably lag screws for use with wood, in order to securely attach dolly 20 to piano 10. Slot 40 in the embodiment of FIG. 6 or slot 54 in the embodiment of FIG. 7 is provided to receive forward pin 38 for adjustment purposes to fit the variability of different pianos. FIG. 8 shows pin 38, which is preferably a 7/16 inch diameter pin with a ¾ inch long mounting segment 39 milled to 5/16 inch and threaded to 5/16 inch threads 51.

Longitudinal support plate 26, which extends to the rear of piano 10, as can be seen in FIG. 1, has rounded or chamfered edges 60, which can further be cushioned to prevent injuries to persons whose foot or ankle might strike plate 26.

Dollies 20 and 22 can be constructed to fit any standard or conventional upright piano, including older as well as new models. Mobility in any direction is assured by providing casters 28 and 32 which swivel through 360° to permit travel in response to horizontal or pushing force on piano 10 in any direction.

When dollies 20 and 22 are in use supporting piano 10, the elevation of piano 10 is so slight that there is no substantial inconvenience or discomfort to a player of the piano, since the piano height is not substantially affected when the present invention is in use. Further, the upper surfaces of the carrying arms 24 and 24', which upper surfaces bear the weight of the associated piano 10 thereon, are disposed at an elevation spaced below the elevation of the axes of rotation of the wheels 62 of the casters 28 and 32. The slight increase in height of the piano 10 resulting from use of the present invention is easily compensated by conventional adjustable height piano stools or by use of a chair having a slightly elevated seating platform. Pianos for use in school and commercial situations must frequently be transported between different rooms within a building, the rooms being ordinarily connected by a standard 36 inch or similar width door passage. In such instances, use of the present invention permits standard and conventional upright pianos to pass through a 36 inch width door without difficulty.

Frequently the floor surface in an environment, particularly a commercial environment in which an upright piano is used or stored, consists of a carpeted surface. In such instances, sliding of the piano across the carpeted floor surface can damage the carpeting and may be impossible without lifting of the piano. Even when the floor is solid, damage, such as scratching, can mar the floor surface finish. With the present invention, a piano can be moved easily over any floor surface, including carpeted or solid floors without damage to either the piano or the floor.

Due to the stability of a piano carried by the safety piano dollies of the present invention, the piano cannot be upset or tipped over inadvertently by an accidental blow, such as can result by a child or adult in a school or commercial situation. At least two instances are known in which upright pianos have been tipped over to cause injuries which have resulted in fatalities. The safety piano dolly of the present invention is constructed particularly for use in school and commercial situations in order to help prevent the possibility of injury to persons in the immediate vicinity of the piano.

While the invention has been described and illustrated for use with an upright piano, the dollies can be used for other articles of furniture, such as portable organs, sofas, or the like.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a transversely elongated upright piano of the type including front and rear facing sides and forwardly projecting lower opposite side support arms to which the lower ends of front opposite side vertical support legs are anchored, a pair of dollies for underlying and supporting opposite sides of said piano, each of said dollies including an elongated front to rear extending carrying arm defining inner and outer side marginal edge portions and front and rear end edges portions, a front upright arm anchored relative to and projecting upwardly from the forward end portion of said inner side marginal portion and terminating upwardly in a horizontal support plate projecting outwardly of said inner side marginal edge portion, a rear upright arm anchored relative to and projecting upwardly from the rear edge portion and terminating upwardly in a horizontal rearwardly directed support plate, and a pair of front and rear casters supported from said support plate in underslung relation thereto, said casters including support wheels journaled for rotation about horizontal axes spaced above said carrying arm, said piano being supported from said dollies with the front to rear extending undersurfaces thereof, including the undersurfaces of said support arms, at opposite sides of said piano overlying and opposing the upper surfaces of said carrying arms, said rear upright arms extending upwardly along and opposing the adjacent rear facing side surfaces of said piano and said front upright arms extending upwardly and opposing forward end portions of the adjacent longitudinal side edges of said support arms.

2. The combination of claim 1 wherein the front and rear end portions of said carrying arms include upstanding forward and rearward anchor pins supported therefrom and said piano includes downwardly opening bores formed therein opening downwardly through said undersurfaces and in which said pins are upwardly telescoped.

3. The piano dolly of claim 2 wherein the rearward anchor pin on each carrying arm projects upwardly from a horizontal tab attached to said carrying arm and projecting outwardly of the inner marginal side edge portion thereof.

4. The piano dolly of claim 3 wherein said forward anchor pin on each carrying arm is received in and slidable along a longitudinal slot formed in and centered on said carrying arm, whereby the longitudinal position of said forward anchor pin is adjustable to permit use with a plurality of piano styles.

* * * * *